US012646391B2

(12) United States Patent
Shimizu

(10) Patent No.: US 12,646,391 B2
(45) Date of Patent: Jun. 2, 2026

(54) ELECTRONIC DEVICE AND CONTROL METHOD THEREOF

(71) Applicant: CANON KABUSHIKI KAISHA, Tokyo (JP)

(72) Inventor: Rurika Shimizu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/920,048

(22) Filed: Oct. 18, 2024

(65) Prior Publication Data

US 2025/0131804 A1 Apr. 24, 2025

(30) Foreign Application Priority Data

Oct. 24, 2023 (JP) ................................ 2023-182345

(51) Int. Cl.
*G08B 7/06* (2006.01)

(52) U.S. Cl.
CPC .................................... *G08B 7/06* (2013.01)

(58) Field of Classification Search
CPC ........................................................ G08B 7/06
See application file for complete search history.

(56) References Cited

U.S. PATENT DOCUMENTS 7,742,923 B2 * 6/2010 Bickel .................. G06F 3/0481 704/275
2005/0093971 A1 * 5/2005 Ono ........................ H04N 7/15 348/14.09
2014/0007245 A1 * 1/2014 Bank .................. G06F 21/6218 726/26
2014/0247319 A1 * 9/2014 Anderson .......... H04L 12/1827 348/14.08
2015/0112748 A1 * 4/2015 Kaye ..................... H04M 3/569 705/7.19
2020/0275057 A1 * 8/2020 Terakura ................ G06F 13/00
2022/0261201 A1 * 8/2022 Sasaki .................... G06V 40/20
2022/0385491 A1 * 12/2022 Morris ................ H04L 12/1822
2023/0223025 A1 * 7/2023 Kawano ............... G02B 27/017 704/235

(Continued)

FOREIGN PATENT DOCUMENTS

EP 3451188 A1 * 3/2019 ............ G06F 3/167
EP 3498558 B1 * 10/2021 ........ B60W 60/0053
JP 2014225801 A 12/2014

(Continued)

*Primary Examiner* — Chico A Foxx
(74) *Attorney, Agent, or Firm* — Cowan, Liebowitz & Latman, P.C.

(57) ABSTRACT

An electronic device according to the present disclosure includes a processor, and a memory storing a program which, when executed by the processor, causes the electronic device to perform a display control process of performing a control such that an object corresponding to a listener of a conversation is displayed to a speaker of the conversation, perform an acquisition process of acquiring information regarding a line of sight of the speaker, and perform a control process of performing, based on the information regarding the line of sight of the speaker, in a case where the speaker is looking at the object corresponding to the listener, a control to give the listener a notification representing that the speaker is looking at the object.

17 Claims, 7 Drawing Sheets

(56) References Cited

U.S. PATENT DOCUMENTS

| | | | | | |
|---|---|---|---|---|---|
| 2024/0169319 | A1 * | 5/2024 | Kimura | .................. | G05B 15/02 |

FOREIGN PATENT DOCUMENTS

| | | | | | | |
|---|---|---|---|---|---|---|
| JP | 2017078893 | A | | 4/2017 | | |
| JP | 2021022909 | A | * | 2/2021 | | |
| JP | 2023047956 | A | * | 4/2023 | | |
| WO | 2018186031 | W | | 10/2018 | | |
| WO | WO-2022137487 | A1 | * | 6/2022 | ............... | H04N 7/15 |

* cited by examiner

ELECTRONIC DEVICE AND CONTROL METHOD THEREOF

BACKGROUND

Field of the Disclosure

The present disclosure relates to an electronic device and particularly relates to an online conversation or conference.

Description of the Related Art

Recently, demands for holding a conversation or a conference between people present at remote locations have increased, and a system (online conference system) for holding a conversation or a conference while displaying a material or a participant user with a computer, a smartphone, or the like via a network has been widely used. In addition, a system (VR conference system) for displaying an avatar representing a user in a virtual reality (VR) space that is generated by a computer and that the user can experience as if the user were in the real space is also present. In the VR conference system, each of users present at remote locations can obtain the sense of reality or the sense of immersion as if the users held a conference on the spot.

A technique using the line of sight of a user is also proposed. WO 2018/186031 discloses a technique of notifying a position at which a user is looking to another user. JP 2017-78893 A discloses a technique of holding a talk with an object (non-user) in the VR space when a user looks at the object and outputs a sound.

When a speaker (utterer) of a conversation changes, the current speaker is likely to look at a person (listener of the conversation) who becomes the next speaker. Based on this action (attentive action), the next speaker to be switched may be determined in a conference held in the real world. By reflecting the line of sight of the user on the line of sight of the avatar, even in the VR conference system, the next speaker to be switched can also be determined based on the attentive action of the speaker (the avatar of the speaker).

SUMMARY

However, in the conference in the real world, when a listener is looking at a conference material instead of a speaker, there is a case where the listener cannot realize that the speaker is looking at the listener. Even in a VR conference system in the related art (VR conference system where the line of sight of the user is reflected on the line of sight of the avatar), unless the listener is looking at the avatar of the speaker, there is a case where the listener cannot realize that the speaker is looking at the listener. Under these circumstances, when the listener does not realize that the speaker is talking to the listener based on the speech content of the speaker, an additional action of calling the listener by name is required. In addition, in the VR conference system in the related art, when an avatar having an appearance of which the line of sight is difficult to figure out is used as the avatar of the speaker, the listener cannot easily realize that the speaker is looking at the listener. Even in an online conference system in the related art, avatars are not used, and thus a listener cannot easily realize that a speaker is looking at the listener.

The present disclosure provides a technique to allow a listener of a conversation to easily realize that a speaker of the conversation is looking at the listener even without looking at the speaker.

An electronic device according to the present disclosure includes a processor, and a memory storing a program which, when executed by the processor, causes the electronic device to perform a display control process of performing a control such that an object corresponding to a listener of a conversation is displayed to a speaker of the conversation, perform an acquisition process of acquiring information regarding a line of sight of the speaker, and perform a control process of performing, based on the information regarding the line of sight of the speaker, in a case where the speaker is looking at the object corresponding to the listener, a control to give the listener a notification representing that the speaker is looking at the object.

Further features of the present disclosure will become apparent from the following description of exemplary embodiments with reference to the attached drawings.

DESCRIPTION OF THE EMBODIMENTS

Hereinafter, embodiments of the present disclosure will be described in conjunction with the accompanying drawings.

Figure 1A:
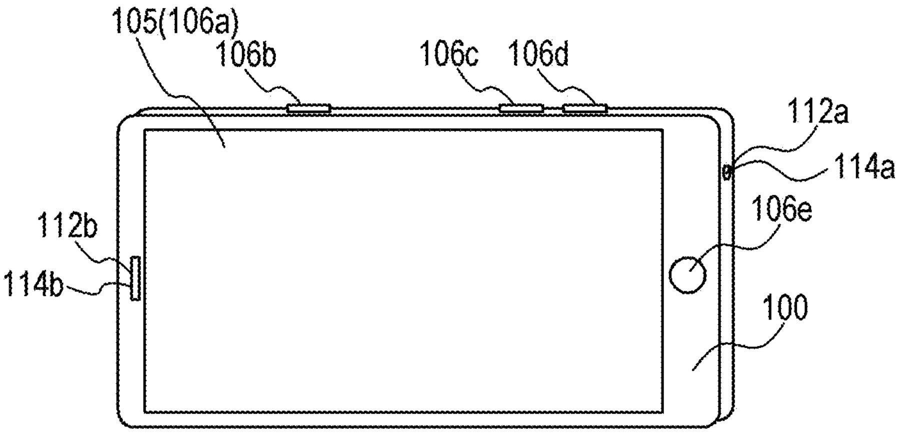
FIG. 1A is an external view of a display control device.

FIG. 1A is an external view of a display control device 100 that is one type of an electronic device to which the present disclosure is applied. The display control device 100 is, for example, a display device such as a smartphone. A display 105 is a display unit that displays an image and various information. The display 105 is configured integrally with a touch panel 106*a*, and can detect a touch operation on a display surface of the display 105. The display control device 100 can execute VR display of a VR image (VR content) on the display 105. An operation unit 106*b* is a power button that receives an operation to switch on and off power of the display control device 100. An operation unit 106*c* and an operation unit 106*d* are volume buttons for increasing or decreasing a volume of a sound output from a speaker 112*b*, an earphone connected to a sound output terminal 112*a*, or an external speaker. An operation unit 106*e* is a home button for displaying a home screen on the display 105. The sound output terminal 112*a* is an earphone jack, and is a terminal that outputs a sound signal to the earphone or the external speaker. The speaker 112*b* is a built-in speaker that outputs a sound. A sound input terminal 114*a* is an earphone jack and is a terminal to which a sound (sound signal) is input from a microphone (mic), an earphone with a microphone, or the like. The sound output terminal 112*a* and the sound input terminal 114*a* may be the common (the same) earphone jack. A microphone 114*b* is a built-in microphone that inputs a sound.

Figure 1B:
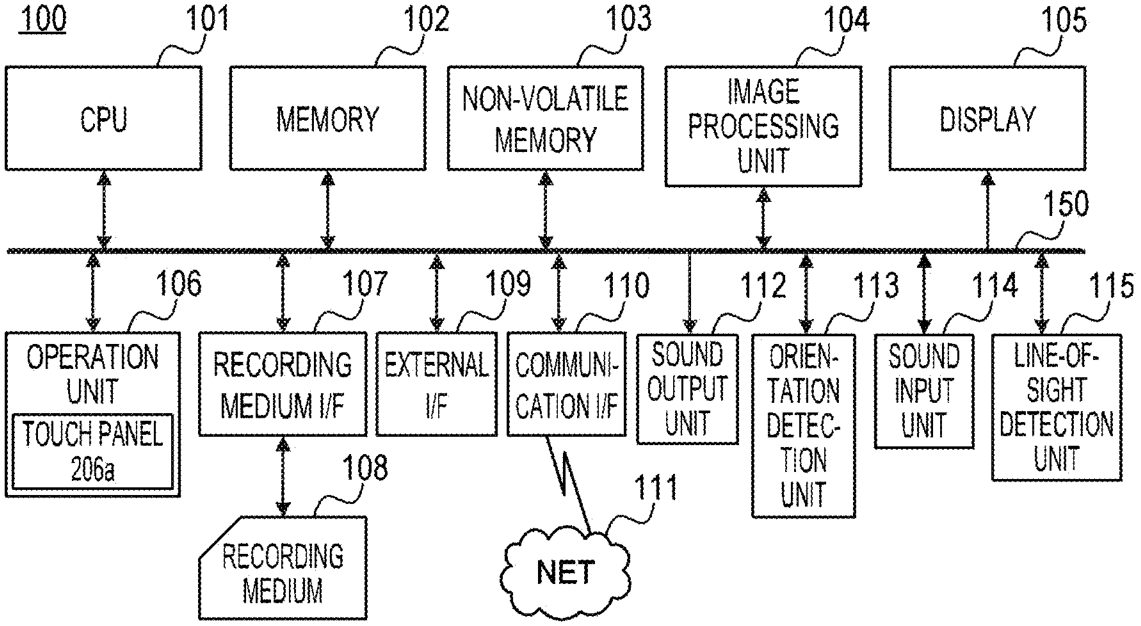
FIG. 1B is a block diagram of the display control device.

FIG. 1B is a block diagram illustrating a configuration example of the display control device 100. A CPU 101, a memory 102, a non-volatile memory 103, an image processing unit 104, the display 105, an operation unit 106, a recording medium I/F 107, an external I/F 109, and a communication I/F 110 are connected to an internal bus 150. In addition, a sound output unit 112, an orientation detection unit 113, a sound input unit 114, and a line-of-sight detection unit 115 are also connected to the internal bus 150. The units connected to the internal bus 150 can exchange data with each other via the internal bus 150.

The CPU 101 is a control unit that controls the entire display control device 100, and includes at least one processor or circuit. The memory 102 is, for example, a RAM (volatile memory using a semiconductor element). For example, the CPU 101 controls each unit of the display control device 100 using the memory 102 as a work memory according to a program stored in the non-volatile memory 103. The non-volatile memory 103 stores various information such as image data, sound data, other data, and various programs for operating the CPU 101. The non-volatile memory 103 is configured with, for example, a flash memory or a ROM.

Based on the control of the CPU 101, the image processing unit 104 executes various types of image processing on an image stored in the non-volatile memory 103 or a recording medium 108, a video signal acquired via the external I/F 109, an image acquired via the communication I/F 110, or the like. The various types of image processing that are executed by the image processing unit 104 include A/D conversion processing, D/A conversion processing, and encoding processing, compression processing, decoding processing, enlargement/reduction processing (resizing), noise reduction processing, and color conversion processing of image data. Furthermore, the image processing unit 104 also executes various types of image processing, for example, panoramic development, mapping processing, or transformation processing of a VR image that is an omnidirectional image or a wide-range image having a wide range of video although not in all directions. The image processing unit 104 may be configured with a dedicated circuit block for executing specific image processing. In addition, depending on the type of image processing, the CPU 101 can execute image processing according to a program without using the image processing unit 104.

The display 105 displays an image and a graphical user interface (GUI) screen configuring a GUI based on the control of the CPU 101. The CPU 101 controls each unit of the display control device 100 to generate a display control signal according to a program, generate a video signal to be displayed on the display 105, and output the video signal to the display 105. The display 105 displays a video based on the generated and output video signal. Note that the configuration of the display control device 100 itself may be at most an interface for outputting a video signal to be displayed on the display 105, and the display 105 may be configured with an external monitor (for example, a television or a head-mounted display (HMD)).

For example, the operation unit 106 is an input device for receiving a user operation that includes a character information input device such as a keyboard, a pointing device such as a mouse or a touch panel, a button, a dial, a joystick, a touch sensor, and a touch pad. In the present embodiment, the operation unit 106 includes the touch panel 106*a* and the operation units 106*b*, 106*c*, 106*d*, and 106*e*.

The recording medium 108 such as a memory card, a CD, or a DVD is mountable on and removable from the recording medium I/F 107. The recording medium I/F 107 reads data from the mounted recording medium 108 and writes data into the recording medium 108 based on the control of the CPU 101. The recording medium 108 is a storage unit that stores various data such as an image to be displayed on the display 105. The external I/F 109 is an interface for connection to an external device via a cable (such as a USB cable) or wirelessly and inputting/outputting (data communication) a video signal or a sound signal. The communication I/F 110 is an interface for communicating (wirelessly communicating) with an external device or the Internet 111 to execute transmission and reception (data communication) of various data such as files and commands.

The sound output unit 112 outputs sound of a moving image or music data reproduced by the display control device 100, an operation sound, a ring tone, and various notification sounds. The sound output unit 112 includes the sound output terminal 112*a* to which an earphone or the like is connected and the speaker 112*b* that is a built-in speaker, but the sound output unit 112 may output sound data to the external speaker by wireless communication or the like.

The orientation detection unit 113 detects the orientation (inclination) of the display control device 100 with respect to the gravity direction or the orientation of the display control device 100 with respect to each axis of the yaw direction, the pitch direction, and the roll direction, and notifies the CPU 101 of orientation information. Based on the orientation detected by the orientation detection unit 113, it is possible to determine whether the display control device 100 is horizontally held, vertically held, directed upward, directed downward, or in an oblique orientation. In addition, it is possible to determine presence or absence and magnitude of inclination of the display control device 100 in the rotation direction such as the yaw direction, the pitch direction, and the roll direction, and whether the display control device 100 has rotated in the rotation direction. One sensor or a combination of a plurality of sensors among an acceleration sensor, a gyro sensor, a geomagnetic sensor, a direction sensor, an altitude sensor, and the like can be used as the orientation detection unit 113.

The sound input unit 114 inputs a sound (sound data) from a microphone or the like. The sound input unit 114 includes the sound input terminal 114*a* to which a microphone or the like is connected and the microphone 114*b* that is a built-in microphone, and the sound input unit 114 may input a sound by wireless communication.

The line-of-sight detection unit 115 detects the line of sight of a user. For example, the line-of-sight detection unit 115 captures an image of the face or eyes of the user to detect the line of sight (a position or a direction at which the user is looking) based on the image of the face or eyes of the user. The CPU 101 can determine a position of an image displayed on the display 105 at which the user is looking based on line-of-sight information obtained by the line-of-sight detection unit 115 (detection result of the line of sight of the user).

As described above, the operation unit 106 includes the touch panel 106*a*. The touch panel 106*a* is an input device configured to overlap the display 105 in a planar manner and output coordinate information corresponding to a position being touched. For the touch panel 106*a*, the CPU 101 can detect the following operations or states.

A first touch of a finger or a pen on the touch panel 106*a*, that is, the start of a touch (hereinafter referred to as touch-down).

A state in which a finger or a pen is in contact with the touch panel 106*a* (hereinafter referred to as touch-on).

A finger or a pen moving in contact with the touch panel 106*a* (hereinafter referred to as touch-move)

An operation in which a finger or a pen that is in contact with the touch panel 106*a* is separated from the touch panel 106*a*, that is, an end of the touch (hereinafter referred to as touch-up).

A state in which nothing is in contact with the touch panel 106*a* (hereinafter referred to as touch-off).

When the touch-down is detected, the touch-on is detected at the same time. After the touch-down, the touch-on is continuously detected unless the touch-up is detected. Also, when the touch-move is detected, the touch-on is continuously detected. Even if the touch-on is detected, the touch-move is not detected as long as the touch position is not moved. After the touch-up of all the fingers or pens having been in contact with the touch panel is detected, the touch-off is detected.

These states and operations and position coordinates at which the finger or the pen is in contact with the touch panel 106*a* are notified to the CPU 101 via the internal bus. The CPU 101 determines what kind of operation (touch operation) is executed on the touch panel 106*a*, based on the notified information. With regard to the touch-move, a movement direction of the finger or the pen moving on the touch panel 106*a* can be determined for each vertical component and for each horizontal component on the touch panel 106*a*, based on a change of the position coordinates. When the touch-move for a predetermined distance or more is detected, it is determined that a sliding operation has been executed.

An operation in which the finger is swiftly moved by a certain distance while being in contact with the touch panel 106*a* and is separated is called a flick. In other words, the flick is an operation in which the finger is swiftly slid on the touch panel 106*a* so as to flick the touch panel 106*a*. When the touch-move at a predetermined speed or higher for a predetermined distance or more is detected and then the touch-up is detected, it can be determined that a flick has been executed (it can be determined that a flick has been executed subsequently to a sliding operation).

Further, a touch operation in which a plurality of locations (for example, two locations) is touched at the same time and touch positions are brought close to each other is referred to as a pinch-in, and a touch operation in which the touch positions are moved away from each other is referred to as a pinch-out. The pinch-out and the pinch-in are collectively referred to as a pinching operation (or simply referred to as a pinch). A method of the touch panel 106*a* may be any of various methods including resistive, capacitive, surface acoustic wave, infrared, electromagnetic induction, image recognition, and optical sensor methods. There are a method of detecting a touch based on contact with a touch panel, and a method of detecting a touch based on approach of a finger or a pen to the touch panel, but any method may be adopted.

Figure 1C:
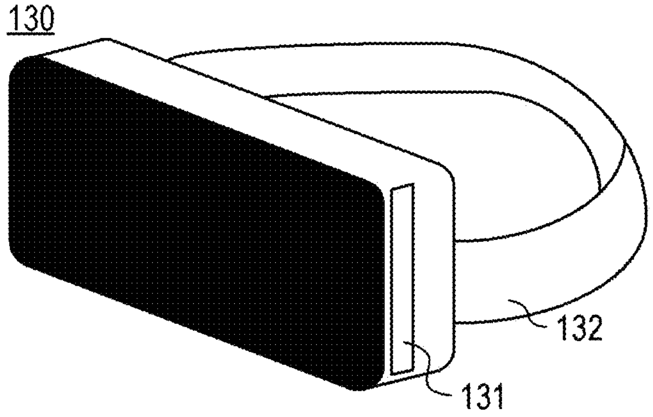
FIG. 1C is an external view of VR goggles.

FIG. 1C is an external view of VR goggles (head-mounted adapter) 130 on which the display control device 100 is mountable. The display control device 100 can also be used as a head-mounted display by being mounted on the VR goggles 130. An insertion port 131 is an insertion port into which the display control device 100 is inserted. The entire display control device 100 can be inserted into the VR goggles 130 with the display surface of the display 105 facing a headband 132 side (that is, the user side) for fixing the VR goggles 130 to the user's head. The user can visually recognize the display 105 without holding the display control device 100 with his/her hand while wearing the VR goggles 130 on which the display control device 100 is mounted on the head. In this case, when the user moves the head or the entire body, the orientation of the display control device 100 also changes. The orientation detection unit 113 detects a change in the orientation of the display control device 100 at this time, and the CPU 101 executes processing for VR display based on the change in the orientation. In this case, detecting the orientation of the display control device 100 by the orientation detection unit 113 is equivalent to detecting the orientation of the head of the user. The orientation of the head may be a direction in which the line of sight of the user is directed, and the line-of-sight detection unit 115 may acquire the detection result of the orientation of the head as the line-of-sight information. Note that the display control device 100 itself may be an HMD that can be mounted on the head even without VR goggles.

It is assumed that the VR image is an image for which VR display (displayed as a display mode "VR view") can be executed. Examples of the VR image include an omnidirectional image (whole-celestial spherical image) captured by an omnidirectional camera (whole-celestial sphere camera) and a panoramic image having a video range (effective video range) larger than a display range that can be displayed at a time on the display unit. Examples of the VR image also include a moving image and a live view image (an image acquired substantially in real time from a camera) as well as a still image. A VR image has a video range (effective video range) of a field of view of up to 360 degrees in an up-and-down direction (vertical angle, angle from the zenith, angle of elevation, angle of depression, elevation angle, or pitch angle) and 360 degrees in a left-to-right direction (horizontal angle, azimuth angle, or yaw angle).

Examples of the VR image also include images having an angle of view wider than an angle of view (field-of-view range) that can be captured by a typical camera or a video range (effective video range) wider than a display range that can be displayed at a time on the display unit, even when the angle of view or video range is smaller than 360 degrees in the up-and-down direction and 360 degrees in the left-to-right direction. For example, an image captured by a whole-celestial sphere camera that can capture an image of an object in a field of view (angle of view) of 360 degrees in the left-to-right direction (horizontal angle or azimuth angle) and 210 degrees in the vertical angle about the zenith is a kind of VR image In addition, for example, an image captured by a camera that can capture an image of an object in a field of view (angle of view) of 180 degrees in the left-to-right direction (horizontal angle or azimuth angle) and 180 degrees in the vertical angle about the horizontal direction is a kind of VR image. That is, an image that has a video range of a field of view of 160 degrees (+80 degrees) or more in both of the up-and-down direction and the left-to-right direction and has a video range wider than a range that a human can visually recognize at a time is a kind of VR image.

If the VR display (displayed as the display mode "VR view") of this VR image is executed, the user can view an omnidirectional video that is seamless in the left-to-right direction (horizontal rotation direction) by changing the orientation of the display device (display device that displays the VR image) in the left-to-right rotation direction. In the up-and-down direction (vertical rotation direction), the user can view an omnidirectional video that is seamless within the range of ±105 degrees as seen from directly above (the zenith). The range beyond 105 degrees from directly above is a blank area where no video is present. A VR image can be said to be an "image having a video range that is at least part of a virtual space (VR space)".

The VR display (VR view) is a display method (display mode) for displaying, from among VR images, video in a field-of-view range in accordance with the orientation of the display device, the display method being capable of changing a display range. When the user wears a head-mounted display (HMD) as a display device and views a video, a video in a field-of-view range in accordance with the direction of the face of the user is displayed. For example, it is assumed that from among the VR images, video is displayed in a field-of-view angle (angle of view) having the center thereof at 0 degrees in the left-to-right direction (a specific cardinal point, for example, the north) and 90 degrees in the up-and-down direction (90 degrees from the zenith, that is, the horizon) at a certain point in time. In this state, if the orientation of the display device is flipped (for example, the display surface is changed from a southern direction to a northern direction), from among the same VR images, the display range is changed to video in a field-of-view angle having the center thereof at 180 degrees in the left-to-right direction (an opposite cardinal point, for example, the south) and 90 degrees (horizon) in the up-and-down direction. When the user who watches a video while wearing an HMD faces the south from the north (that is, looks back), video displayed on the HMD is changed from a video to the north to a video to the south. Such VR display of a VR image can provide the user with the visual sense (sense of immersion) as if the user stayed in the VR image (in the VR space). A smartphone mounted on VR goggles (head-mounted adapter) is a type of the HMD.

The display method of the VR image is not limited to the above-described examples. For example, the display range may be moved (scrolled) in response to a user operation via a touch panel, directional buttons, or the like instead of a change in orientation. In addition to the change of the display range by changing the orientation during the VR display (in the "VR View" display mode), the display range may be changed in response to the touch-move on the touch panel, a dragging operation with a mouse device or the like, or pressing the directional buttons.

An example where a user who wears the VR goggles 130 on which the display control device 100 is mounted on the head uses a VR conference system application will be described.

Figure 2A:
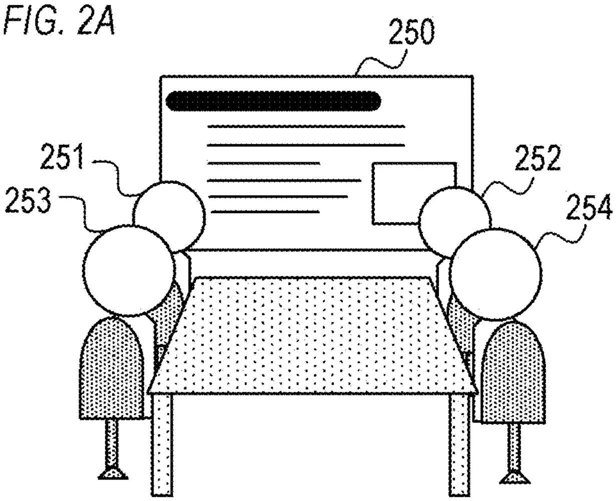
FIGS. 2A and 2B are schematic views of a VR space.
Figure 2B:
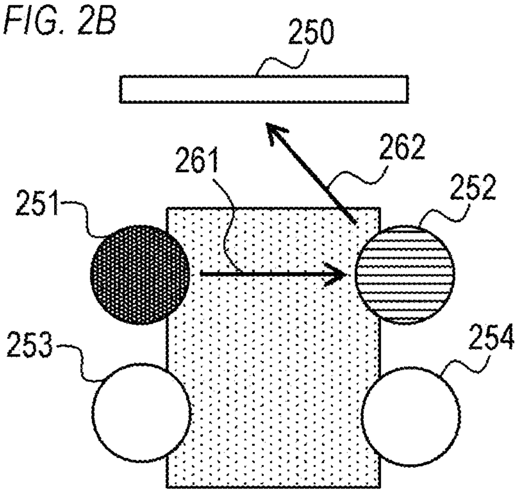

FIGS. 2A and 2B are schematic views illustrating a VR space constructed by the VR conference system application. FIG. 2A illustrates a state of a conference (VR conference) when horizontally seen from a higher perspective, and FIG. 2B illustrates a state of the VR conference when seen from the top. In the VR conference system application, avatars corresponding to participants of the VR conference (virtual objects representing the participants) are disposed in the VR space. In FIGS. 2A and 2B, four avatars 251 to 254 corresponding to four participants are disposed to surround a table that is a virtual object, and each of the avatars 251 to 254 sits on a chair that is a virtual object. In FIGS. 2A and 2B, a screen 250 that is a virtual object is also disposed in the VR space. On the screen 250, a material or the like for the conference is displayed. Each of the participants can see the screen 250 with a view of his/her own avatar. A screen may be prepared for each of the participants (avatars). For example, four screens respectively corresponding to the four participants (four avatars 251 to 254) may be prepared. When another object is present between the avatar and the screen, the participant corresponding to the avatar may see the screen through the other object.

It is assumed that the avatar 251 is an avatar of a participant who is a speaker of a conversation, and the avatars 252 to 254 are avatars of participants who are listeners of the conversation. In FIG. 2B, arrow 261 indicates a line-of-sight direction of the avatar 251, and arrow 262 indicates a line-of-sight direction of the avatar 252. The avatar 251 (speaker) is looking at the avatar 252 while expecting a reaction of the avatar 252 (listener). However, the avatar 252 is looking at the screen 250 without looking at the avatar 251.

Figure 3A:
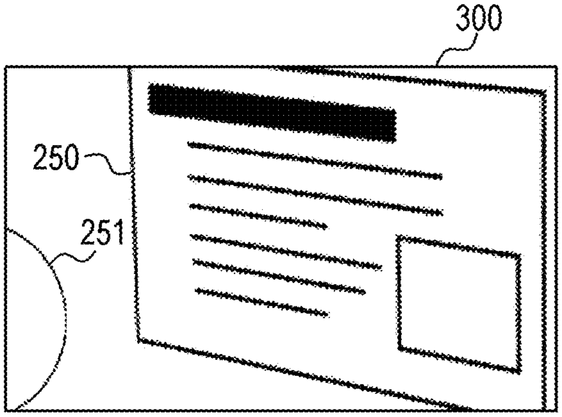
FIGS. 3A and 3B are schematic views of screens of a VR conference system application.

FIG. 3A is a schematic view illustrating a screen 300 of the VR conference system application displayed on the display 105. The screen 300 is a VR view screen that displays a view from a position of the avatar. The screen 300 is rendered based on the disposition of each of the avatars and the orientation of the display control device 100 (the orientation of the head of the user and the direction of the face (head) of the user) detected by an orientation detection unit 213. It is assumed that the avatar corresponding to the user of the display control device 100 is the avatar 252. Therefore, the view from the position of the avatar 252 is displayed on the screen 300. As described above, the avatar 252 (listener) is looking at the screen 250. Therefore, the screen 250 accounts for most of the screen 300 (the field of view of the avatar 252), and the avatar 251 (speaker) is partially cut off, and it is difficult to visually recognize the avatar 251.

The screen of the VR conference system application is not limited to the VR view screen. For example, the screen of the VR conference system application may be a screen view screen where the same display as that of the screen 250 is executed on the entirety or most of the display area of the display 105.

Figure 3B:
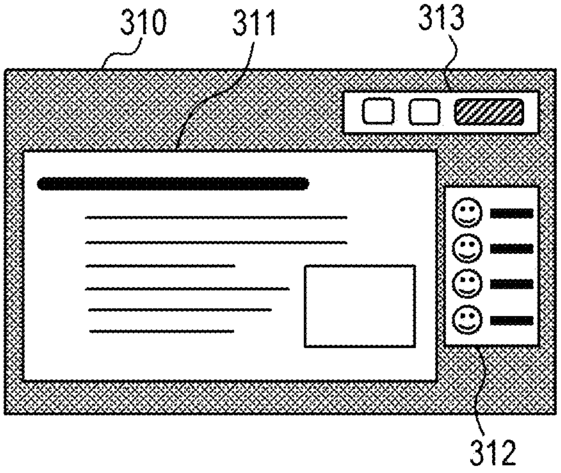

FIG. 3B is a schematic view illustrating a screen 310 of the VR conference system application. The screen 310 is a screen view screen. In an area 311 of the screen 310, the same display as that of the screen 250 is executed. On the screen 310, a participant list 312 and an operation panel 313 are displayed. The participant list 312 is a list representing each of the participants with an icon or a name (ID). The operation panel 313 includes various operation objects for a user operation. For example, the operation panel 313 includes a button for entry and exit into and from the VR conference, a button for switching on and off a microphone, and a button for switching on and off a camera.

The participant list 312 and the operation panel 313 may be displayed on the VR view screen. In addition, the operation panel 313 may include a button for switching the display screen between a plurality of screens including the VR view screen and the screen view screen. The screen view screen may be a screen where the area 311 (screen where the same display as that of the screen 250 is executed) is superimposed on the VR view screen. In this case, the VR view screen may be seen through the area 311. The reduced VR view screen may be displayed on the screen view screen.

Figure 4:
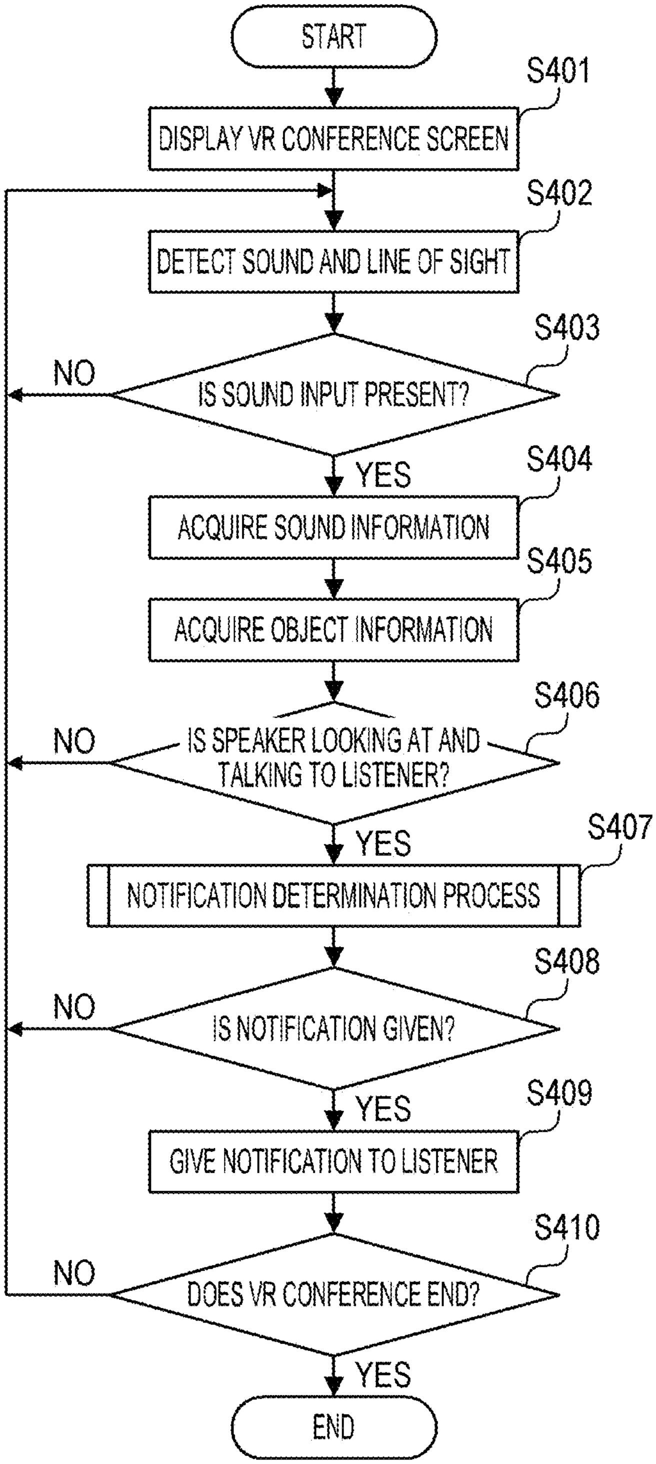
FIG. 4 is a flowchart of an operation of the display control device.

FIG. 4 is a flowchart illustrating the operation of the display control device 100. This operation is implemented by the CPU 101 loading a program stored in the non-volatile memory 103 to the memory 102 and executing the loaded program. For example, when the display control device 100 starts and an instruction to start the VR conference using the VR conference system application is given, the operation of FIG. 4 starts.

In S401, the CPU 101 displays the display 105 on the screen of the VR conference system application. For example, the CPU 101 displays the VR view screen or the screen view screen on the display 105. As a result, objects corresponding to the participants of the VR conference are displayed on the display 105. The objects corresponding to the participants are, for example, the avatars on the VR view screen and are the icons or the names in the participant list on the screen view screen. The object corresponding to the user of the display control device 100 may or may not be displayed.

In S402, the CPU 101 detects a sound of the user using the sound input unit 114, and detects the line of sight of the user using the line-of-sight detection unit 115.

In S403, the CPU 101 determines whether or not the sound of the user is detected based on the result of the sound detection in S402. When the sound is detected (when the user is the speaker), the process proceeds to S404. Otherwise, the process proceeds to S402.

In S404, the CPU 101 acquires sound information regarding a sound output from the user (speaker) based on the result of the sound detection in S402. The sound information includes, for example, information (time code) regarding a period of time in which the user (speaker) outputs the sound. The sound information may include sound data or may include text data generated by transcription of the sound data.

In S405, the CPU 101 acquires information regarding the line of sight of the user (speaker). In the present embodiment, the CPU 101 acquires object information regarding an object at which the user is looking. The object information includes, for example, information (a participant name and an ID) representing the object at which the user is looking and information (time code) representing a period of time in which the user is looking at the object.

For example, the CPU 101 acquires line-of-sight position information regarding a line-of-sight position of the user (speaker) based on the result of the line-of-sight detection in S402, and acquires line-of-sight object information regarding an object displayed at the line-of-sight position (object to which the line of sight of the user is directed). The CPU 101 may acquire face direction object information regarding the object to which the face of the user is directed based on the orientation of the display control device 100 detected by the orientation detection unit 113. The CPU 101 may acquire either or both of the line-of-sight object information and the face direction object information. The object information may include information representing the kind of the object information (information representing whether the object information is the line-of-sight object information or the face direction object information). The CPU 101 may acquire the object information for all the displayed objects, or may acquire the object information for only the avatars of the participants other than the user of the display control device 100.

In S406, the CPU 101 determines whether or not the user (speaker) is looking at and talking to the object corresponding to the listener (the participant other than the user) based on the sound information acquired in S404 and the object information acquired in S405. For example, the CPU 101 determines whether or not the object information representing a period of time corresponding to the period of time represented by the sound information represents the object of the listener. When the user is looking at and talking to the object corresponding to the listener (when the object information representing a period of time corresponding to the period of time represented by the sound information represents the object of the listener.), the process proceeds to S407. Otherwise, the process proceeds to S402. When the user is looking at but is not talking to the object corresponding to the listener, the process proceeds to S402.

Without using the sound information, the CPU 101 may determine whether or not the user is looking at the object corresponding to the listener based on the information regarding the line of sight of the user (speaker). When the user is looking at the object corresponding to the listener, the process proceeds to S407. Otherwise, the process proceeds to S402. In this case, S404 may be skipped.

In S407, the CPU 101 executes a notification determination process of determining whether or not to give a notification to the listener detected in S406 (the listener corresponding to the object to which the user (speaker) is looking at and talking to). The details of the notification determination process will be described below using FIGS. 5A to 5D.

In S408, the CPU 101 switches the process based on the result of the notification determination process in S407. When the notification is given to the listener detected in S406, the process proceeds to S409. Otherwise, the process proceeds to S402. When S407 and S408 are skipped and the user is looking at (is looking at and talking to) the object corresponding to the listener, the process proceeds from S406 to S409.

In S409, the CPU 101 gives the notification to the listener detected in S406. For example, the CPU 101 gives the notification to the display control device of the listener detected in S406 by transmitting a control signal to the display control device of the listener detected in S406 via the communication I/F 110. The notification method is not particularly limited, and a visual notification may be given by display, an auditory notification may be given by sound output, or a haptic notification may be given by vibration. Among these plurality of notifications, any one notification may be given, or a combination of two or more notifications may be given. The notification information may be designated by the control signal.

In S410, the CPU 101 determines whether or not the user gives an instruction to end the VR conference using the operation unit 106. When the user gives the instruction to end the VR conference, the operation of FIG. 4 ends. Otherwise, the process proceeds to S402.

FIGS. 5A to 5D are flowcharts illustrating the notification determination process of S407 of FIG. 4. The CPU 101 may execute only any one notification determination process or a plurality of notification determination processes among four notification determination processes illustrated in FIGS. 5A to 5D. The CPU 101 may appropriately switch and execute the plurality of notification determination processes, or a process of a combination of the plurality of notification determination processes may be executed.

Figure 5A:
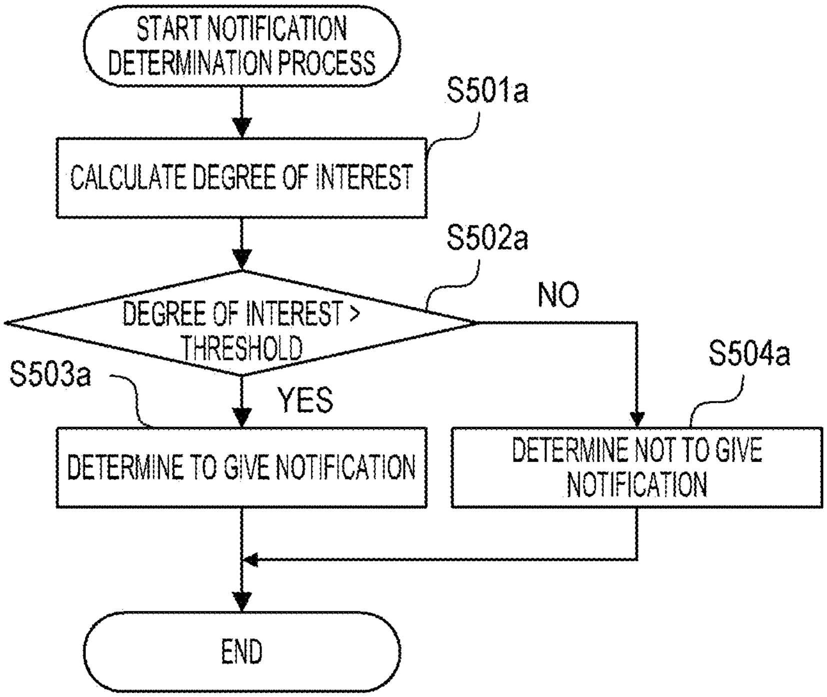
FIGS. 5A to 5D are flowcharts of a notification determination process.

In the notification determination process of FIG. 5A, when a degree of interest (priority) of the user for the object of the listener detected in S406 of FIG. 4 (the listener corresponding to the object to which the user (speaker) is looking at and talking) is higher than a threshold, the CPU 101 determines to give the notification to the listener.

In S501*a*, the CPU 101 calculates the degree of interest of the user for the object of the listener detected in S406. For example, the CPU 101 calculates the degree of interest using Expression 1 below from a time for which the line of sight is directed to the object (line-of-sight time), a weight of the line-of-sight time (line-of-sight weight value), a time for which the face is directed to the object (face direction time), and a weight of the face direction time (face direction weight value). The line-of-sight weight value is larger than the face direction weight value. When a plurality of listeners is detected in S406, the CPU 101 calculates the degree of interest for each of the plurality of listeners.

$$\text{Degree of Interest} = \text{Line-of-Sight Weight Value} \times \text{Line-of-Sight Time} + \text{Face Direction Weight Value} \times \text{Face Direction Time}$$

In S502*a*, the CPU 101 determines whether or not the degree of interest calculated in S501*a* is larger than a predetermined threshold. When the degree of interest is larger than the predetermined threshold, the process proceeds to S503*a*. Otherwise, the process proceeds to S504*a*.

In S503*a*, the CPU 101 determines to give the notification to the listener detected in S406.

In S504*a*, the CPU 101 determines not to give the notification.

When a plurality of listeners is detected in S406, the CPU 101 executes the processes of S502*a* to S504*a* for each of the plurality of listeners.

Figure 5B:
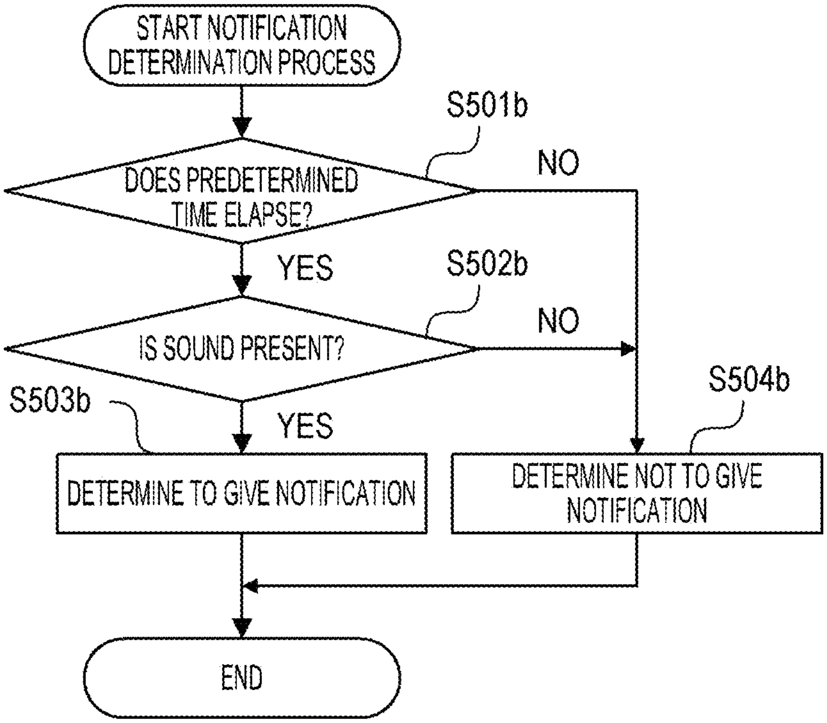

In the notification determination process of FIG. 5B, the CPU 101 determines to give the notification after a predetermined time elapses in a state where the user (speaker) stops outputting a sound and any participant does not output a sound. It is considered that, when any participant does not output a sound, each of the participants cannot figure out who is the next participant to speak and cannot determine whether or not each of the participants may speak. In this case, the notification can be given to urge the participant to speak.

In S501*b*, the CPU 101 determines whether or not the predetermined time elapses from the detection of the sound of the user in S402 of FIG. 4. When the predetermined time elapses, the process proceeds to S502*b*. Otherwise, the process proceeds to S504*b*. When the sound of the user is not detected in S402, the process proceeds from S403 to S402, but there is an exception. When the sound of the user is not detected in the next S402 in a state where any participant does not output a sound after detecting the sound of the user in S402, the speaker is not switched, and thus the process proceeds from S403 to S404. When the sound of the user is not detected in the next S402 in a state where a participant other than the user outputs a sound after detecting the sound of the user in S402, the participant is the speaker (the speaker is switched), and the process proceeds from S403 to S402.

In S502*b*, the CPU 101 determines whether or not the participant outputs a sound. When the participant does not output a sound, the process proceeds to S503*b*. Otherwise, the process proceeds to S504*b*. The sound information (sound data) of the user of the display control device 100 is acquired using the sound input unit 114, and the sound information (sound data) of the participant other than the user is acquired from the display control device of the participant via the communication I/F 110.

In S503*b*, the CPU 101 determines to give the notification to the listener detected in S406.

In S504*b*, the CPU 101 determines not to give the notification.

Figure 5C:
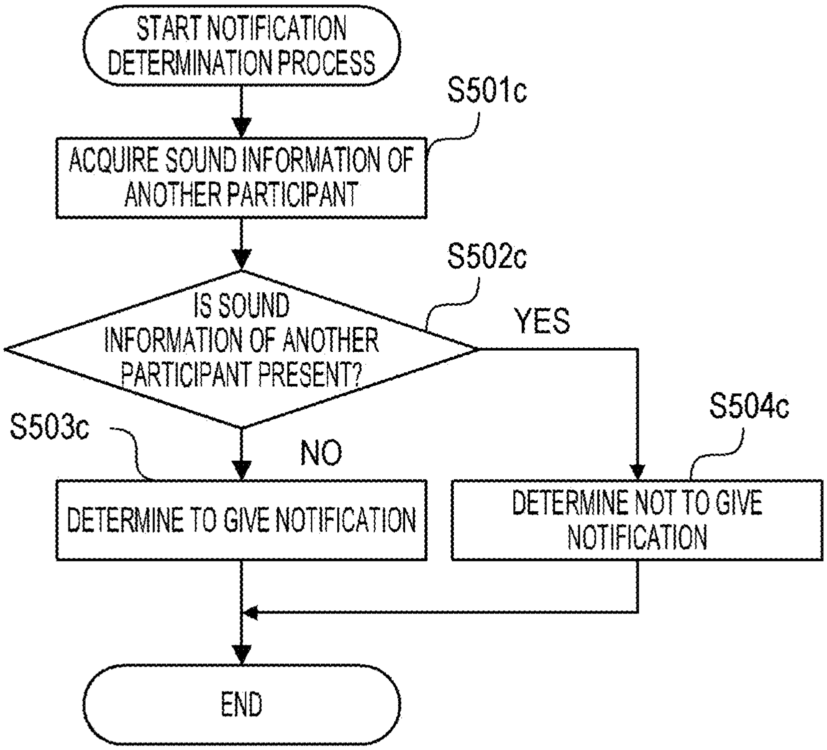

In the notification determination process of FIG. 5C, when a plurality of participants outputs sounds, the notification to urge the participants to speak is unnecessary and interruptive. Therefore, the CPU 101 determines not to give the notification.

In S501*c*, the CPU 101 acquires the sound information of the participant other than the user from the display control device of the participant via the communication I/F 110.

In S502*c*, the CPU 101 determines whether or not the sound information is acquired in S501*c*. When the sound information is acquired, that is, when the user and the participant other than the user output sounds at the same timing, the process proceeds S504*c*. Otherwise, the process proceeds S503*c*.

In S503*c*, the CPU 101 determines to give the notification to the listener detected in S406.

In S504*c*, the CPU 101 determines not to give the notification.

Figure 5D:
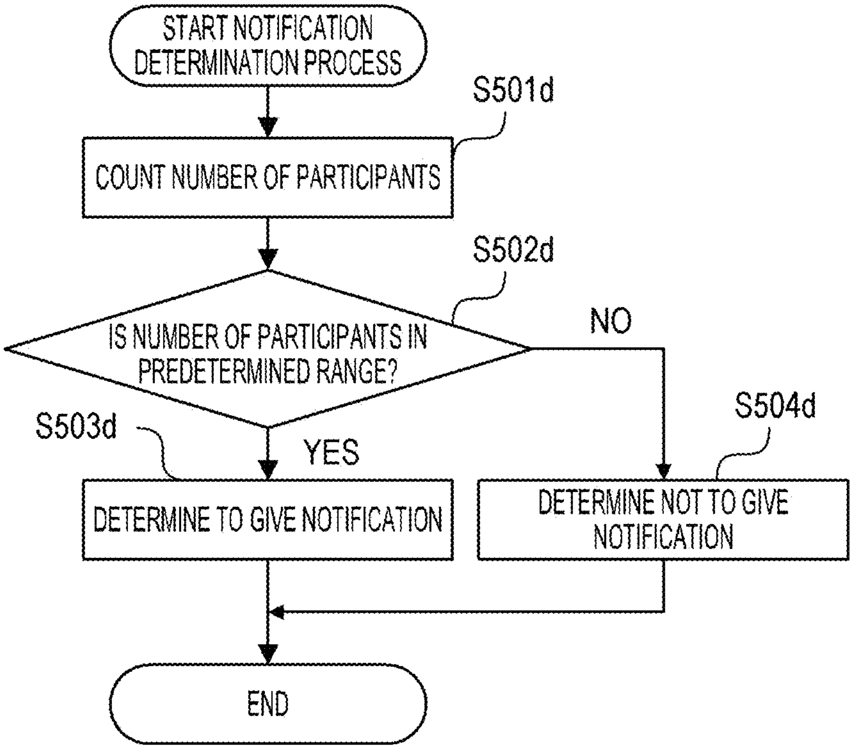

In the notification determination process of FIG. 5D, when the number of participants in the VR conference is not in a predetermined range, the CPU 101 determines not to give the notification. For example, when the number of participants in the VR conference is two, the participant to which the speaker is talking is clear. In addition, depending on the VR conference, there is a case where one participant (host) is taking to many participants (guests) and does not want to urge the guests to speak. In the notification determination process of FIG. 5D, in this case, the unnecessary (interruptive) notification can be suppressed.

In S501*d*, the CPU 101 acquires the user information of the participant other than the user from the display control device of the participant via the communication I/F 110, and the number of participants in the VR conference (the number of participants in the VR conference including the user) is counted. Instead of the user information of the participant other than the user, another information such as the sound information of the participant may be used.

In S502*d*, the CPU 101 determines whether the number of the participants counted in S501*d* is in the predetermined range. When the number of the participants is in the predetermined range, the process proceeds to S503*d*. Otherwise, the process proceeds to S504*d*. The predetermined range may be a fixed range common to the plurality of participants or may be a range designated by the user.

In S503*d*, the CPU 101 determines to give the notification to the listener detected in S406.

In S504*d*, the CPU 101 determines not to give the notification.

The notification determination process is not limited to the above-described process. For example, the user predesignates the participant to which the notification is to given, and when the object at which the user is looking at (is looking at and talking to) is the object of the participant to which the notification is to given, the CPU 101 may determine to give the notification. Otherwise, the CPU 101 may determine not to give the notification. When the number of the listeners detected in S406 is in a predetermined range, the CPU 101 may determine not to give the notification. Otherwise, the CPU 101 may determine not to give the notification. The CPU 101 may set whether to give the notification to each of the participants in response to an instruction from the user, or may set the predetermined range of the listeners detected in S406. Various parameters including these parameters may be set during the VR conference.

Figure 6:
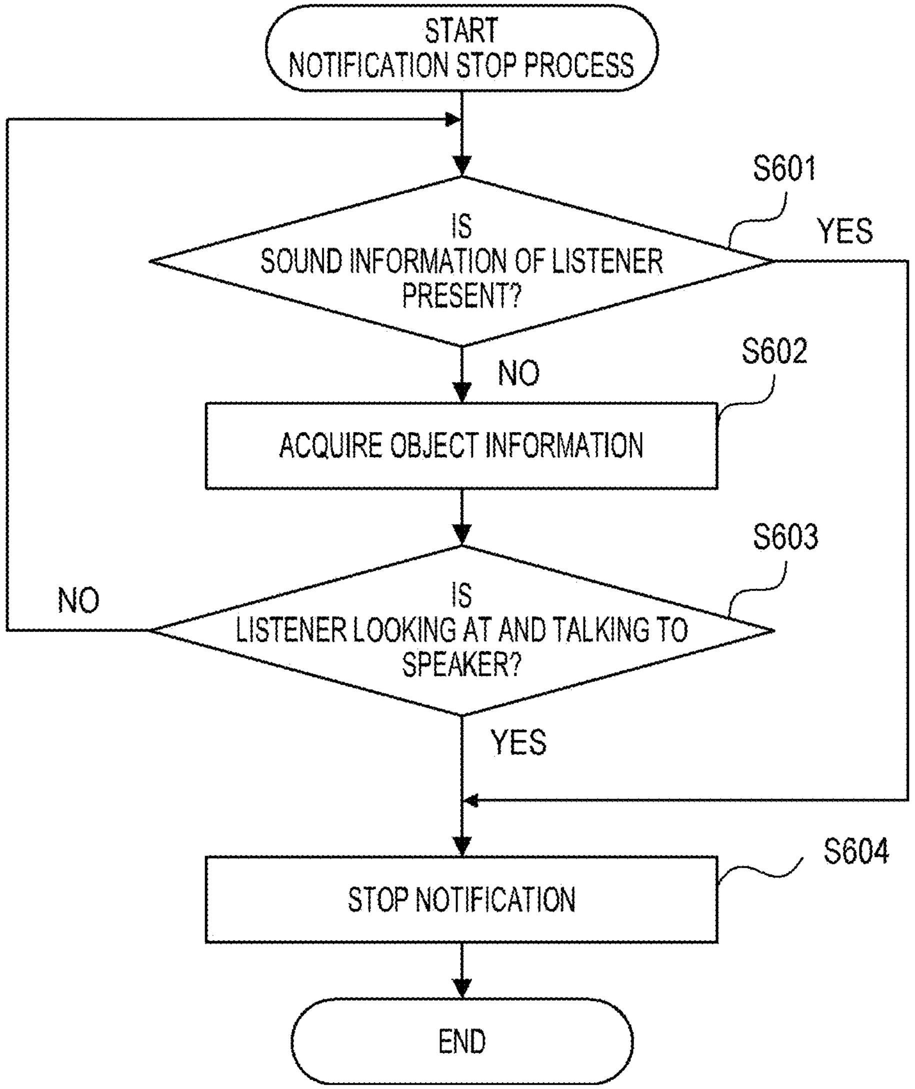
FIG. 6 is a flowchart of a notification stop process.

FIG. 6 is a flowchart illustrating a notification stop process. This process is implemented by the CPU 101 loading a program stored in the non-volatile memory 103 to the memory 102 and executing the loaded program. When the notification is given (starts) in S409 of FIG. 4, the process of FIG. 6 starts.

The notification of S409 is given for making the listener detected in S406 the next speaker. When the listener detected in S406 outputs a sound (when the listener detected in S406 is the speaker), of course, the CPU 101 may stop the notification. When the listener detected in S406 does not recognize the notification but another participant (another listener) outputs a sound, the notification does not function.

Therefore, the CPU 101 may stop the notification. When the listener detected in S406 looks at the object of the user (speaker), the notification also does not function. Therefore, the CPU 101 may stop the notification. In the notification stop process of FIG. 6, in these cases, the CPU 101 stops the notification.

In the present embodiment, when the user of the display control device 100 is the listener and the display control device 100 gives the notification to the user, the display control device 100 executes the process of FIG. 6. When the user of the display control device 100 is the speaker and the notification is given to the listener (the listener detected in S406) that is the participant other than the user, the display control device 100 may execute the process of FIG. 6. In this case, the display control device 100 stops the notification to the listener by transmitting the control signal to the display control device of the listener to which the notification is giving.

In S601, the CPU 101 determines whether or not the sound information of the listener is present. That is, the CPU 101 determines whether or not the listener outputs a sound. When the sound information of the listener is present (when the listener outputs a sound), the process proceeds to S604. Otherwise, the process proceeds to S602. The sound information (sound data) of the user of the display control device 100 is acquired using the sound input unit 114, and the sound information (sound data) of the participant other than the user is acquired from the display control device of the participant via the communication I/F 110. Who is the speaker and who is the listener are managed by the display control device of each of the participants based on the sound information of the participant.

In S602, the CPU 101 acquires the object information (the line-of-sight object information or the face direction object information) representing the object at which the user (the listener to which the notification is giving) is looking using the line-of-sight detection unit 115 or the orientation detection unit 113.

In S603, the CPU 101 determines whether or not the user (the listener to which the notification is giving) is looking at the speaker based on the object information acquired in S602. When the user is looking at the speaker, the process proceeds to S604. Otherwise, the process proceeds to S601.

In S604, the CPU 101 stops the notification to the user.

The notification stop process is not limited to the above-described process. For example, one of the determination of S601 and the determination of S603 may be skipped. When the process proceeds from S403 or S406 to S402 of FIG. 4, the CPU 101 may stop the notification. That is, the CPU 101 may stop the notification when the speaker stops outputting a sound, or may stop the notification when the speaker stops looking at the listener (listener to which the notification is giving). The case where the speaker stops looking at the listener (listener to which the notification is giving) also includes a case where the speaker stops looking at the listener and looks at another listener.

Figure 7A:
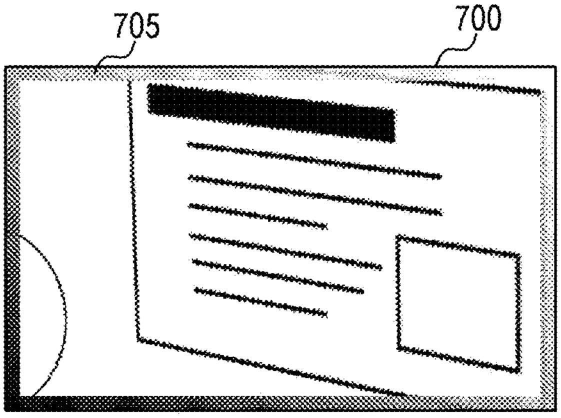
FIGS. 7A and 7B are schematic views of screens where a notification is being given.
Figure 7B:
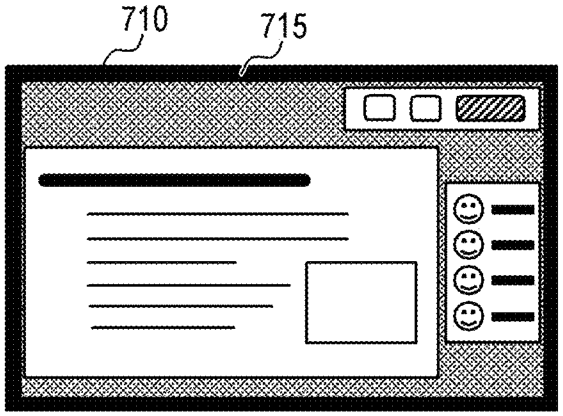

FIGS. 7A and 7B are schematic views illustrating screens where the notification of S409 of FIG. 4 is being given.

A screen 700 of FIG. 7A is the VR view screen. In FIG. 7A, a notification frame 705 along the outline (edge) of the screen 700 is displayed as the notification of S409. The VR space may be seen through the notification frame 705. The listener can easily realize the notification frame 705, and thus can easily realize that the speaker is looking at the listener. When the listener realizes that the speaker is looking at the listener, the listener may attempt to look at the avatar. Therefore, it is preferable that the notification of S409 includes a notification of a position of the avatar of the speaker (the object corresponding to the speaker). The notification frame 705 is displayed with gradation such that the color is thickened toward the position of the avatar of the speaker. As a result, the listener can easily figure out the position of the avatar of the speaker. By making the notification frame 705 more noticeable with animation, the listener may be urged to look at the avatar of the speaker.

A screen 710 of FIG. 7B is the screen view screen. In FIG. 7B, a notification frame 715 along the outline (edge) of the screen 710 is displayed as the notification of S409. The listener can easily realize the notification frame 705, and thus can easily realize that the speaker is looking at the listener.

The display of the notification frame 705 or 715 is effective as display for preventing the notification from interfering the VR conference, but the notification of S409 is not limited thereto. For example, pop-up display may be executed as the notification of S409. In the pop-up display, a direct content that the speaker is looking at the listener or that the speaker is talking to the listener may be notified. A character string (text data) representing words output from the speaker may be generated by transcription of the sound information (sound data) of the speaker. The generated character string may be displayed. The summary of the character string (the words output from the speaker) may be generated and displayed. Based on the generated character string or the sound information of the speaker, the intention (for example, question or attention) of the words of the speaker may be determined to recognizably notify the intention.

Figure 8:
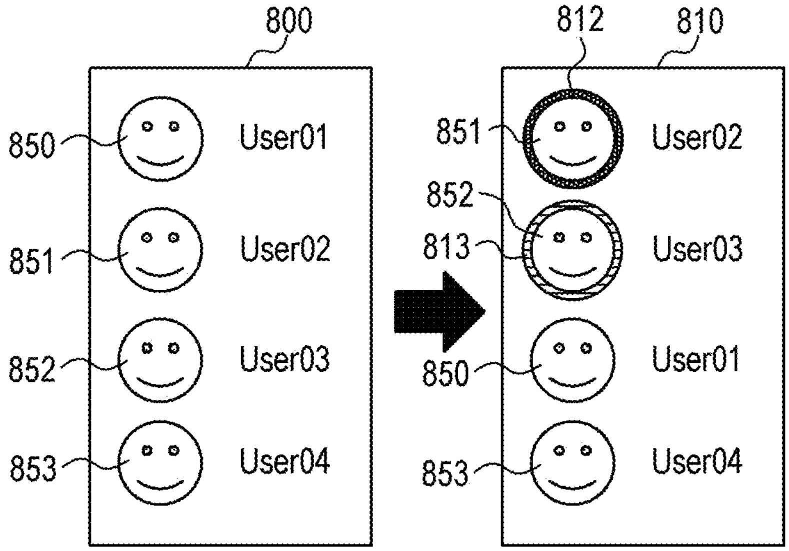
FIG. 8 is a schematic view of transition of the screen by the notification.

As the notification of S409, a notification illustrated in FIG. 8 may be given. In FIG. 8, a participant list 800 is a participant list in a state where the speaker is not present and the notification is not giving, and a participant list 810 is a participant list in a state where the speaker is present and the notification is giving. In the participant list 800 or 810, names (ID) and icons of four participants are arranged. The names of the four participants are User01 to User04, and icons 850 to 853 correspond to User01 to User04, respectively.

Here, it is assumed that User02 is the speaker and is looking at and talking to User03 that is the listener. In this case, the participant list transitions from the participant list 800 to the participant list 810. In the participant list 810, the icon 851 of User02 (speaker) is highlighted by a frame 812, and the icon 852 of User03 (listener) at which User02 (speaker) is looking is highlighted by a frame 813. The frame 812 and the frame 813 are displayed to be distinguishable from each other. For example, the frame 812 and the frame 813 are displayed by different colors or patterns. As a result, it is identifiable that User02 is as the speaker and is looking at and talking to User03 as the listener. The participants who see the participant list 810 can easily realize that User02 is as the speaker and is looking at and talking to User03 as the listener. Further, User02 (speaker) is displayed on the head (uppermost), and User03 (listener) at which User02 (speaker) is looking is displayed on the second uppermost line. As a result, it is identifiable that User03 (listener) is a candidate of the next speaker. The participants can be easily realized that User03 (listener) is a candidate of the next speaker.

The above-described transition of the participant list may be executed only on the display control device of User03 (listener) to which the notification is to given, or may be executed on the display control devices of all the participants.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present disclosure are also included in the present disclosure. The present disclosure also includes other configurations obtained by suitably combining various features of the embodiment.

For example, the present disclosure is not limited to an HMD (including a smartphone mounted on VR goggles) and is also applicable to an information processing device that is provided separately from the HMD (for example, a personal computer connected to the HMD). The present disclosure is not limited to a client device on the user side and is also applicable to a host server device (server device) connected to the client device via a network.

In addition, the present disclosure is also applicable to an online conference system other than the VR conference system. For example, when a video where videos of a plurality of participants are displayed in a plurality of areas of a screen of a computer and a user is looking at and talking to an area of a participant other than the user, a notification may be given to the participant. The present disclosure is also applicable to a case where an MR technique or an AR technique is used instead of the VR technique. In this case, an object of each of participants is displayed in the real space.

According to the present disclosure, a listener of a conversation easily realizes that a speaker of the conversation is looking at the listener even without looking at the speaker.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-182345, filed on Oct. 24, 2023, which is hereby incorporated by reference herein in its entirety.

What is claimed is:

1. An electronic device comprising:

a processor; and a memory storing a program which, when executed by the processor, causes the electronic device to perform a display control process of performing a control such that an object corresponding to a listener of a conversation is displayed to a speaker of the conversation, perform an acquisition process of acquiring information regarding a line of sight of the speaker, and perform a control process of performing, based on the information regarding the line of sight of the speaker, in a case where the speaker is looking at the object corresponding to the listener, a control to give the listener a notification representing that the speaker is looking at the object, wherein in the control process, after start of the notification, a control is performed such that the notification is stopped in at least one of a case where the listener outputs a sound, a case where the listener looks at the speaker, a case the speaker stops outputting a sound, and a case the speaker stops looking at the listener.

2. The electronic device according to claim 1, wherein the program, when executed by the processor, further causes the electronic device to perform a determination process of determining whether or not the speaker is looking at the object corresponding to the listener based on the information regarding the line of sight of the speaker, and in the control process, a control is performed such that, in a case where it is determined that the speaker is looking at the object corresponding to the listener, the notification is given to the listener.

3. The electronic device according to claim 2, wherein the program, when executed by the processor, further causes the electronic device to perform a second acquisition process of acquiring sound information regarding a sound output from the speaker, in the acquisition process, object information regarding an object at which the speaker is looking is acquired as the information regarding the line of sight of the speaker, in the determination process, whether or not the speaker is looking at and talking to the object corresponding to the listener is determined based on the sound information and the object information, and in the control process, a control is performed such that, in a case where the speaker is looking at but is not talking to the object corresponding to the listener, the notification is not given to the listener, and in a case where it is determined that the speaker is looking at and talking to the object corresponding to the listener, the notification is given to the listener.

4. The electronic device according to claim 3, wherein the sound information represents a period of time in which the speaker outputs the sound.

5. The electronic device according to claim 4, wherein the object information represents a period of time in which the speaker is looking at the object corresponding to the object information.

6. The electronic device according to claim 5, wherein in the determination process, whether or not the speaker is looking at and talking to the object corresponding to the listener is determined based on the object information representing a period of time corresponding to the period of time represented by the sound information.

7. The electronic device according to claim 1, wherein in the display control process, a control is performed such that a plurality of objects respectively corresponding to a plurality of listeners of the conversation is displayed to the speaker, and in the control process, a control is performed such that the notification is given to a listener corresponding to an object at which the speaker is looking with a higher degree of interest than a threshold among the plurality of listeners based on the information regarding the line of sight of the speaker.

8. The electronic device according to claim 1, wherein in the control process, in a case where a number of participants of the conversation is not in a predetermined range, the notification is not given to the listener.

9. The electronic device according to claim 1, wherein in the control process, in a case where a plurality of participants of the conversation outputs sounds, the notification is not given to the listener.

10. The electronic device according to claim 1, wherein in the control process, a control is performed such that the notification is given to the listener after the speaker stops outputting a sound and then a predetermined time elapses in a state where any participant of the conversation does not output a sound.

11. The electronic device according to claim 1, wherein the notification includes a notification regarding a position of the object corresponding to the speaker or a notification regarding information with which the speaker is identifiable.

12. The electronic device according to claim 1, wherein in the control process, a control is performed such that the notification is given to the listener by display.

13. The electronic device according to claim 1, wherein in the control process, a control is performed such that the notification is given to the listener by sound output.

14. The electronic device according to claim 1, wherein the program, when executed by the processor, further causes the electronic device to perform a detection process of detecting the line of sight of the speaker.

15. The electronic device according to claim 1, wherein the electronic device is mounted by the speaker.

16. A control method of an electronic device, comprising:

performing a control such that an object corresponding to a listener of a conversation is displayed to a speaker of the conversation;

acquiring information regarding a line of sight of the speaker, and performing, based on the information regarding the line of sight of the speaker, in a case where the speaker is looking at the object corresponding to the listener, a control to give the listener a notification representing that the speaker is looking at the object, wherein after start of the notification, a control is performed such that the notification is stopped in at least one of a case where the listener outputs a sound, a case where the listener looks at the speaker, a case the speaker stops outputting a sound, and a case the speaker stops looking at the listener.

17. A non-transitory computer readable medium that stores a program, wherein the program causes a computer to execute a control method of an electronic device, the control method comprising:

performing a control such that an object corresponding to a listener of a conversation is displayed to a speaker of the conversation;

acquiring information regarding a line of sight of the speaker, and performing, based on the information regarding the line of sight of the speaker, in a case where the speaker is looking at the object corresponding to the listener, a control to give the listener a notification representing that the speaker is looking at the object, and after start of the notification, a control is performed such that the notification is stopped in at least one of a case where the listener outputs a sound, a case where the listener looks at the speaker, a case the speaker stops outputting a sound, and a case the speaker stops looking at the listener.

* * * * *